US009231796B2

(12) United States Patent
Bulzacchelli et al.

(10) Patent No.: US 9,231,796 B2
(45) Date of Patent: Jan. 5, 2016

(54) POWER AWARE EQUALIZATION IN A SERIAL COMMUNICATIONS LINK

(71) Applicant: International Business Machines Corporation, Armonk, NY (US)

(72) Inventors: John F. Bulzacchelli, Yonkers, NY (US); Hayden C. Cranford, Jr., Cary, NC (US); Daniel M. Dreps, Georgetown, TX (US); David W. Siljenberg, Byron, MN (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 65 days.

(21) Appl. No.: 14/088,484

(22) Filed: Nov. 25, 2013

(65) Prior Publication Data

US 2015/0146768 A1    May 28, 2015

(51) Int. Cl.
*H04L 25/03*    (2006.01)

(52) U.S. Cl.
CPC .... *H04L 25/03885* (2013.01); *H04L 25/03006* (2013.01); *H04L 2025/03592* (2013.01)

(58) Field of Classification Search
CPC .............. H04L 25/03; H04L 25/03006; H04L 25/03878; H04L 25/03885; H04L 2025/03006; H04L 2025/03592
USPC .................. 375/232, 233, 257, 285, 346, 350
See application file for complete search history.

(56) References Cited

U.S. PATENT DOCUMENTS

| 6,067,458 | A | 5/2000 | Chen |
| 7,492,816 | B1* | 2/2009 | Wong et al. .................. 375/232 |
| 2009/0154626 | A1* | 6/2009 | Anderson et al. ............. 375/360 |
| 2012/0294379 | A1 | 11/2012 | Martwick |
| 2013/0010854 | A1 | 1/2013 | Sawey et al. |
| 2013/0073749 | A1* | 3/2013 | Tremblay et al. ............... 710/16 |
| 2015/0002408 | A1* | 1/2015 | Mozak et al. ................. 345/173 |

FOREIGN PATENT DOCUMENTS

| EP | 1 183 840 B1 | 1/2005 |
| EP | 1 354 274 B1 | 6/2008 |
| EP | 1 692 831 B1 | 1/2010 |
| WO | WO 2012/068500 A1 | 5/2012 |

* cited by examiner

*Primary Examiner* — Young T Tse
(74) *Attorney, Agent, or Firm* — Edward J. Lenart; Kennedy Lenart Spraggins LLP (57) ABSTRACT

Power aware equalization in a serial communications link that includes a transmitter and a receiver, including: determining, by a power aware equalization module, a required signal eye width and a required signal eye height for signals received by the receiver; identifying one or more signal equalizers for signals transmitted over the serial communications link; identifying one or more cumulative equalizer settings that equalize signals transmitted over the serial communications link to conform with the required signal eye width and the required signal eye height for signals received by the receiver; determining power consumption values associated with each of the one or more cumulative equalizer settings; and setting the one or more signal equalizers to configuration settings in dependence upon the power consumption values associated with each of the one or more cumulative equalizer settings.

18 Claims, 4 Drawing Sheets

POWER AWARE EQUALIZATION IN A SERIAL COMMUNICATIONS LINK

BACKGROUND

The present disclosure is generally related to data processing, or, more specifically, methods, apparatus, and products for power aware equalization in a serial communications link that includes a transmitter and a receiver.

DESCRIPTION OF RELATED ART

Modern computing systems can include communications links utilized by a transmitter and a receiver to exchange analog signals representing digital values. As transmission frequencies increase, many variables can affect the integrity of the signals. For example, transmission-line defects, impedance mismatches, termination schemes, grounding schemes, and other factors may cause signals to become distorted. Physical properties of the transmitter, PCB traces, connectors, and cables may also introduce interference that will degrade a signal both in its amplitude and timing. In addition, intersymbol interference can also degrade the quality of a signal. As such, modern computing systems will frequently include components that equalize a signal. The operation of such components, however, can require significant amounts of power from a power source.

SUMMARY

Methods, apparatuses, and products for power aware equalization in a serial communications link that includes a transmitter and a receiver, including: determining, by a power aware equalization module, a required signal eye width and a required signal eye height for signals received by the receiver; identifying, by the power aware equalization module, one or more signal equalizers for signals transmitted over the serial communications link; identifying, by the power aware equalization module, one or more cumulative equalizer settings that equalize signals transmitted over the serial communications link to conform with the required signal eye width and the required signal eye height for signals received by the receiver; determining, by the power aware equalization module, power consumption values associated with each of the one or more cumulative equalizer settings; and setting, by the power aware equalization module, the one or more signal equalizers to configuration settings in dependence upon the power consumption values associated with each of the one or more cumulative equalizer settings.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
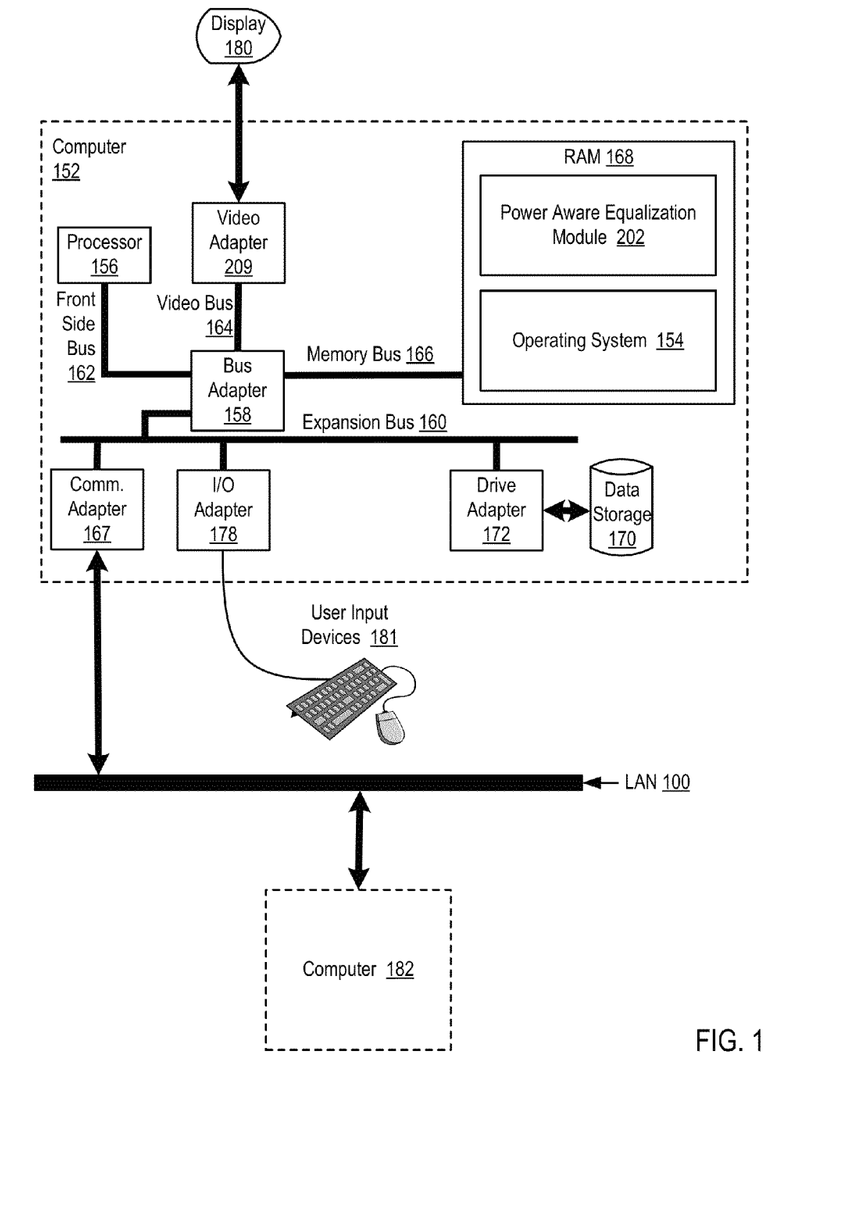
FIG. 1 sets forth a block diagram of automated computing machinery comprising an example computer useful in power aware equalization in a serial communications link that includes a transmitter and a receiver according to embodiments described herein.

Example methods, apparatus, and products for power aware equalization in a serial communications link that includes a transmitter and a receiver in accordance with embodiments described herein with reference to the accompanying drawings, beginning with FIG. 1. FIG. 1 sets forth a block diagram of automated computing machinery comprising an example computer (152) useful in power aware equalization in a serial communications link that includes a transmitter and a receiver according to embodiments described herein. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a power aware equalization module (202), a module of computer program instructions for power aware equalization in a serial communications link that includes a transmitter and a receiver according to embodiments described herein. The power aware equalization module (202) of FIG. 1 may be configured to carry out power aware equalization in a serial communications link that includes a transmitter and a receiver by: determining a required signal eye width and a required signal eye height for signals received by the receiver; identifying one or more signal equalizers for signals transmitted over the serial communications link; identifying one or more cumulative equalizer settings that equalize signals transmitted over the serial communications link to conform with the required signal eye width and the required signal eye height for signals received by the receiver; determining power consumption values associated with each of the one or more cumulative equalizer settings; and setting the one or more signal equalizers to configuration settings in dependence upon the power consumption values associated with each of the one or more cumulative equalizer settings.

Also stored in RAM (168) is an operating system (154). Operating systems useful power aware equalization in a serial communications link that includes a transmitter and a receiver according to embodiments described herein include UNIX™ Linux™ Microsoft XP™ AIX™ IBM's i5/OS™ and others as will occur to those of skill in the art. The operating system (154) and the power aware equalization module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for power aware equalization in a serial communications link that includes a transmitter and a receiver according to embodiments described herein include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for power aware equalization in a serial communications link that includes a transmitter and a receiver according to embodiments described herein include modems for wired dial-up communications, Ethernet (IEEE 802.3) adapters for wired data communications network communications, and 802.11 adapters for wireless data communications network communications.

Figure 2:
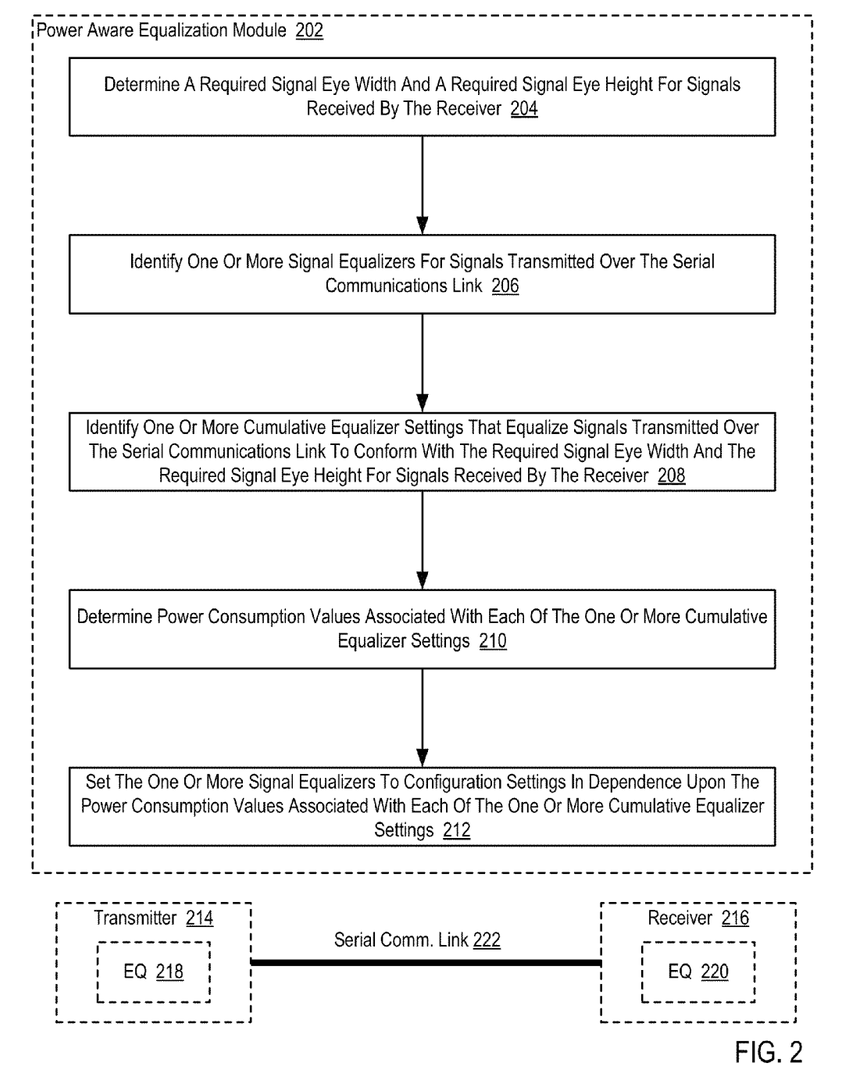
FIG. 2 sets forth a flow chart illustrating an example method for power aware equalization in a serial communications link that includes a transmitter and a receiver according to embodiments described herein.

For further explanation, FIG. 2 sets forth a flow chart illustrating an example method for power aware equalization in a serial communications link (222) that includes a transmitter (214) and a receiver (216) according to embodiments described herein. The example method of FIG. 2 is carried out, at least in part, by a power aware equalization module (202). In the example method of FIG. 2, the power aware equalization module (202) may be embodied as a module of computer circuitry that operates as a state machine and resides on a chip that include the transmitter (214), receiver (216), and serial communications link (222). In alternative embodiments, the power aware equalization module (202) may be embodied as a module of computer program instructions executing on computer hardware that is configured for data communications with computing machinery that controls the operation of the transmitter (214) and receiver (216). Readers will appreciate that the power aware equalization module (202) may therefore be embodied as computer hardware, computer software, or any combination thereof.

The example method of FIG. 2 includes determining (204), by the power aware equalization module (202), a required signal eye width and a required signal eye height for signals received by the receiver (216). In the example method of FIG. 2, an eye width and an eye height may be depicted as components of an eye diagram. An eye diagram is so called because, for several types of coding, the diagram looks like one or more eyes between a pair of rails. The opening of the eye has a vertical height and a horizontal width which may be used to derive a number of communication channel performance measurements. Generally, an open eye pattern corresponds to minimal signal distortion along the communications channel, and a closure of an eye pattern corresponds to intersymbol interference and noise in the communications channel. Specifically, as vertical height of the eye opening decreases, the presence of additive noise in the signal increases and as the width of the eye opening decreases the presence of jitter in the signal increases. In the example method of FIG. 2, the binary value of an analog signal may be reliably determined when signals received by the receiver (216) confirm to a required signal eye width and a required signal eye height.

The example method of FIG. 2 also includes identifying (206), by the power aware equalization module (202), one or more signal equalizers (218, 220) for signals transmitted over the serial communications link (222). In the example method of FIG. 2, each of the one or more signal equalizers (218, 220) may be embodied as computer circuitry for equalizing a signal transmitted over the serial communications link (222). For example, each of the one or more signal equalizers (218, 220) may be embodied as computer circuitry for removing the effects of intersymbol interference ('ISI') in which the transmission of one signal interferes with subsequently transmitted signals. Each of the one or more signal equalizers (218, 220) may be embodied as computer circuitry for removing random noise, crosstalk, or other form of signal distortion. Readers will appreciate that the one or more signal equalizers (218, 220) may be embodied as computer circuitry for removing the effects of any form of signal distortion such that a receiver (216) may discern the original signal (i.e., the signal coming out of the transmitter) given a distorted signal at the receiver (216). In such a way, signals may be more reliably transmitted over the serial communications link (222).

In the example method of FIG. 2, the one or more signal equalizers (218, 220) may reside within the transmitter (214), within the receiver (216), between the transmitter (214) and the receiver (216), or any combination thereof. Furthermore, the one or more signal equalizers (218, 220) may be embodied as different types of equalizers. For example, the one or more signal equalizers (218, 220) may include a transmitter-side feed forward equalizer ('FFE'), a receiver-side decision feedback equalizer ('DFE'), a receiver-side continuous-time linear equalizer ('CTLE'), and so on. Readers will appreciate that in view of the fact that each of the one or more signal equalizers (218, 220) may be embodied as different types of equalizers that reside in different locations, the effect on total system power consumption may be different for each of the one or more signal equalizers (218, 220). For example, utilizing a first signal equalizer (218) to equalize a signal may require more power from a power supply than utilizing a second signal equalizer (220) to equalize the signal. Likewise, the one or more signal equalizers (218, 220) may not remove signal distortion with equal levels of effectiveness.

The example method of FIG. 2 also includes identifying (208), by the power aware equalization module (202), one or more cumulative equalizer settings that equalize signals transmitted over the serial communications link (222) to conform with the required signal eye width and the required signal eye height for signals received by the receiver (216). In the example method of FIG. 2, the one or more cumulative equalizer settings may represent combinations of settings on each of the one or more signal equalizers (218, 220). For example, a first cumulative equalizer setting may represent a group of settings such that a first equalizer (218) performs no equalization operations and the second equalizer (220) is an 8-tap DFE that uses only the first four taps to perform signal equalization. Likewise, a second cumulative equalizer setting may represent a group of settings such that a first equalizer (218) performs no equalization operations and the second equalizer (220) is an 8-tap DFE that uses only the first six taps to perform signal equalization. In such a way, each cumulative equalizer setting represents a distinct combination of settings for each of the signal equalizers (218, 220) identified in step 206.

In the example method of FIG. 2, one or more cumulative equalizer settings are identified (208) that equalize signals transmitted over the serial communications link (222) to conform with the required signal eye width and the required signal eye height for signals received by the receiver (216). Readers will appreciate that various cumulative equalizer settings may be tested or simulated for test. In the example method of FIG. 2, only those cumulative equalizer settings that equalize signals transmitted over the serial communications link (222) to conform with the required signal eye width and the required signal eye height for signals received by the receiver (216) will be identified (208). Cumulative equalizer settings that do not equalize signals transmitted over the serial communications link (222) to conform with the required signal eye width and the required signal eye height for signals received by the receiver (216) will be discarded from further consideration.

The example method of FIG. 2 also includes determining (210), by the power aware equalization module (202), power consumption values associated with each of the one or more cumulative equalizer settings. In the example method of FIG. 2, each particular setting a particular equalizer (218) may be associated with a value indicating the amount of power required to operate the particular equalizer (218) at the particular setting. In such an example, the amount of power required to operate the particular equalizer (218) at the particular setting may be determined, for example, during manufacturing and testing of the particular equalizer (218). In such an example, determining (210) power consumption values associated with a particular cumulative equalizer setting may be carried out by summing the amount of power required to operate the each equalizer (218, 220) at its respective setting for a particular cumulative equalizer setting. By determining (210) power consumption values associated with each of the one or more cumulative equalizer settings, the power aware equalization module (202) may therefore identify the amount of power that is required to operate the equalizers (218, 220) at each cumulative setting that equalizes signals transmitted over the serial communications link (222) to conform with the required signal eye width and the required signal eye height for signals received by the receiver (216).

The example method of FIG. 2 also includes setting (212), by the power aware equalization module (202), the one or more signal equalizers (218, 220) to configuration settings in dependence upon the power consumption values associated with each of the one or more cumulative equalizer settings. In the example method of FIG. 2, setting (212) each of the one or more signal equalizers (218, 220) to a particular configuration setting may be carried out by sending a message to the each of the signal equalizers (218, 220) that includes the particular configuration setting that the signal equalizer (218, 220) should utilize when operating. In the example method of FIG. 2, the one or more signal equalizers (218, 220) are set (212) to configuration settings in dependence upon the power consumption values associated with each of the one or more cumulative equalizer settings. For example, the one or more signal equalizers (218, 220) may be set (212) to configuration settings that correspond with the lowest power usage of the identified (208) cumulative equalizer settings that equalize signals transmitted over the serial communications link (222) to conform with the required signal eye width and the required signal eye height for signals received by the receiver (216).

Figure 3:
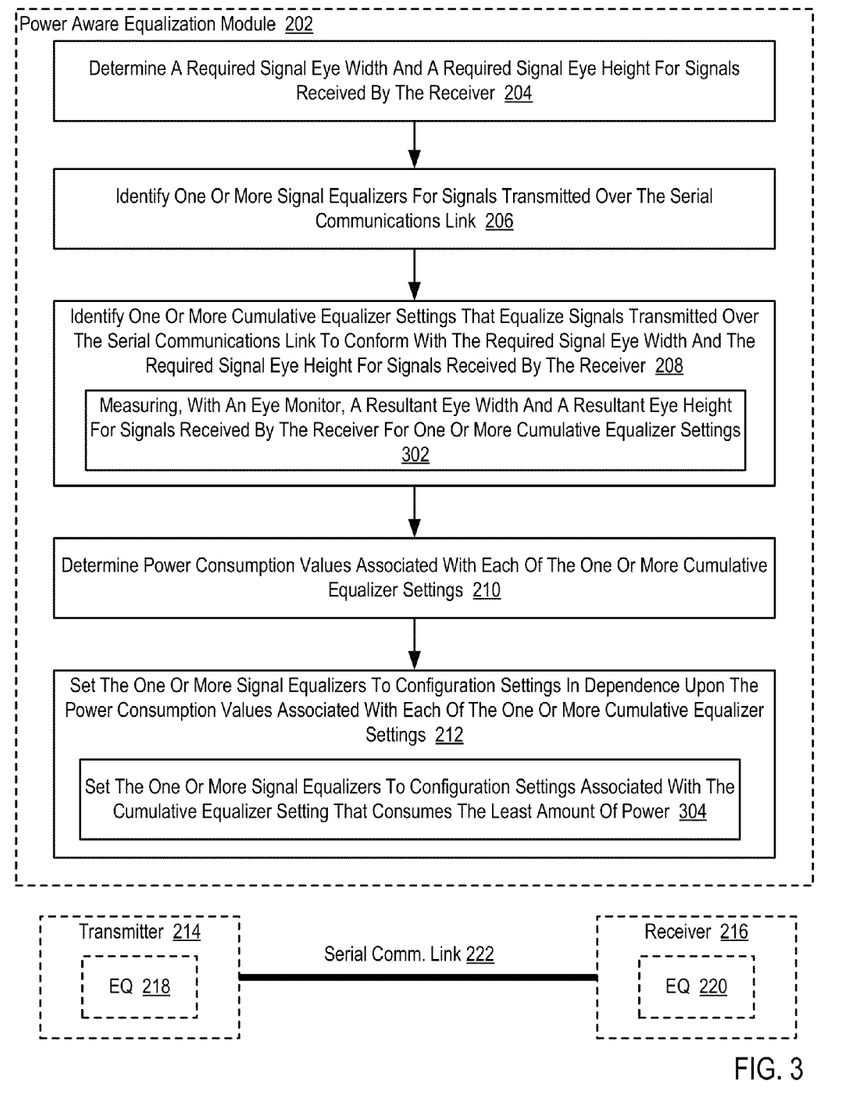
FIG. 3 sets forth a flow chart illustrating an additional example method for power aware equalization in a serial communications link that includes a transmitter and a receiver according to embodiments described herein.

For further explanation, FIG. 3 sets forth a flow chart illustrating an additional example method for power aware equalization in a serial communications link (222) that includes a transmitter (214) and a receiver (216) according to embodiments described herein. The example method of FIG. 3 is similar to the example method of FIG. 2 as it also includes determining (204) a required signal eye width and a required signal eye height for signals received by the receiver (216), identifying (206) one or more signal equalizers (218, 220) for signals transmitted over the serial communications link (222), identifying (208) one or more cumulative equalizer settings that equalize signals transmitted over the serial communications link (222) to conform with the required signal eye width and the required signal eye height for signals received by the receiver (216), determining (210) power consumption values associated with each of the one or more cumulative equalizer settings, and setting (212) the one or more signal equalizers (218, 220) to configuration settings in dependence upon the power consumption values associated with each of the one or more cumulative equalizer settings.

In the example method of FIG. 3, identifying (208) one or more cumulative equalizer settings that equalize signals transmitted over the serial communications link (222) to conform with the required signal eye width and the required signal eye height for signals received by the receiver (216) can include measuring (302), with an eye monitor, a resultant eye width and a resultant eye height for signals received by the receiver (216) for one or more cumulative equalizer settings. In the example method of FIG. 3, the eye monitor may be embodied as an oscilloscope, a virtualized oscilloscope, or other tool for observing the change of an electrical signal over time, such that the voltage and time describe a waveform which is continuously graphed against a calibrated scale.

In the example method of FIG. 3, setting (212) the one or more signal equalizers (218, 220) to configuration settings in dependence upon the power consumption values associated with each of the one or more cumulative equalizer settings can include setting (304) the one or more signal equalizers to configuration settings associated with the cumulative equalizer setting that consumes the least amount of power. In the example method of FIG. 3, each of the cumulative equalizer settings have been identified (208) as settings that equalize signals transmitted over the serial communications link (222) to conform with the required signal eye width and the required signal eye height for signals received by the receiver (216). In such a way, each of the cumulative equalizer settings that have been identified (208) may result in the transmission of a signal in an acceptable format, as the cumulative equalizer settings result in signals transmitted over the serial communications link (222) that conform with the required signal eye width and the required signal eye height for signals received by the receiver (216). In view of the fact that each of the identified (208) cumulative equalizer settings result in the transmission of an acceptable signal, the power aware equalization module (202) may utilize the cumulative equalizer setting that consumes the least amount of power in order to minimize total power consumption in the computing system.

Figure 4:
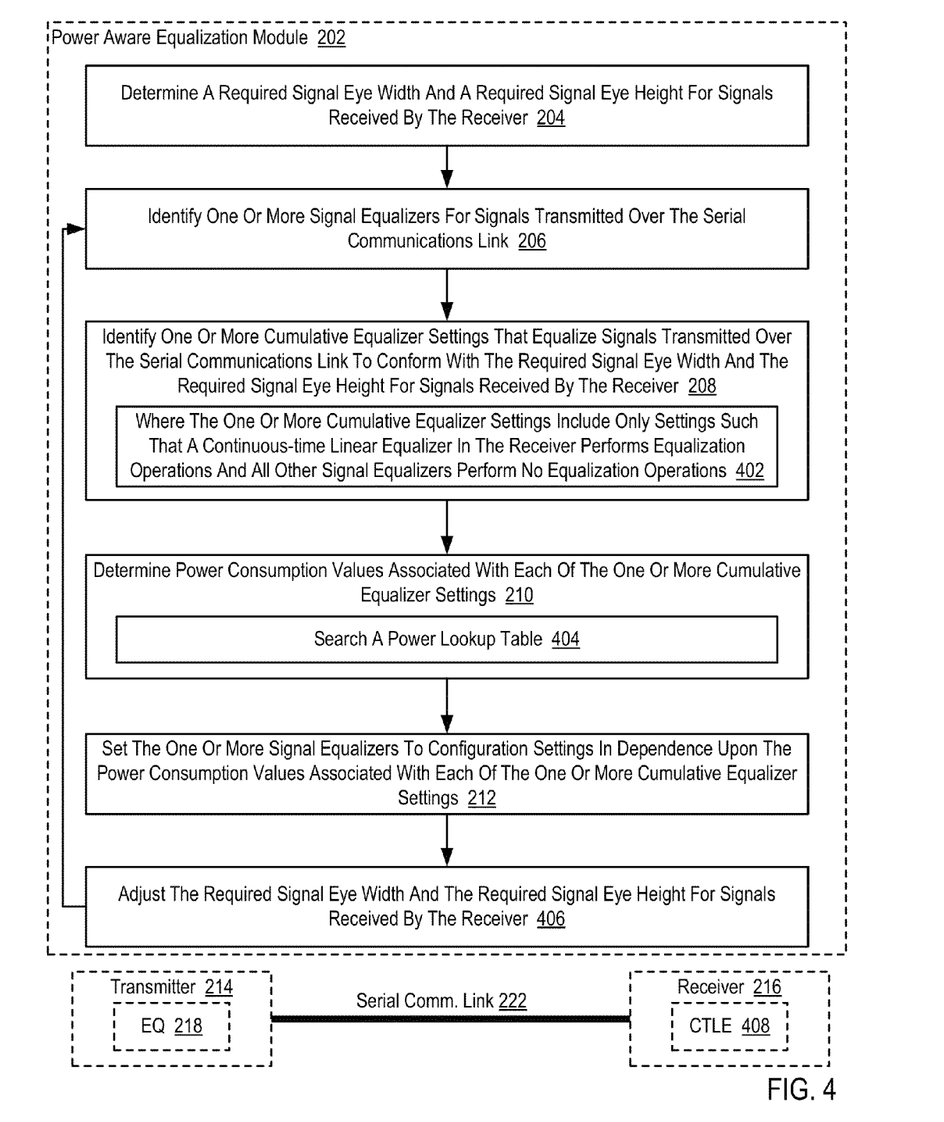
FIG. 4 sets forth a flow chart illustrating an additional example method for power aware equalization in a serial communications link that includes a transmitter and a receiver according to embodiments described herein.

For further explanation, FIG. 4 sets forth a flow chart illustrating an additional example method for power aware equalization in a serial communications link (222) that includes a transmitter (214) and a receiver (216) according to embodiments described herein. The example method of FIG.

4 is similar to the example method of FIG. 2 as it also includes determining (204) a required signal eye width and a required signal eye height for signals received by the receiver (216), identifying (206) one or more signal equalizers (218, 220) for signals transmitted over the serial communications link (222), identifying (208) one or more cumulative equalizer settings that equalize signals transmitted over the serial communications link (222) to conform with the required signal eye width and the required signal eye height for signals received by the receiver (216), determining (210) power consumption values associated with each of the one or more cumulative equalizer settings, and setting (212) the one or more signal equalizers (218, 220) to configuration settings in dependence upon the power consumption values associated with each of the one or more cumulative equalizer settings.

The example method of FIG. 4 can also include adjusting (406), by the power aware equalization module (202), the required signal eye width and the required signal eye height for signals received by the receiver (216). In the example method of FIG. 4, adjusting (406) the required signal eye width and the required signal eye height for signals received by the receiver (216) may be carried out in response to a user, system administrator, or other entity requesting such a change. Such a change may be necessary, for example, if the required signal eye width and the required signal eye height for signals received by the receiver (216) no longer result in a signal that can be reliably read. In the example method of FIG. 4, adjusting (406) the required signal eye width and the required signal eye height for signals received by the receiver (216) may be carried out by the power aware equalization module (202) receiving user input, a message from a system administrator, and so on.

In the example method of FIG. 4, the one or more cumulative equalizer settings can include only settings such that a continuous-time linear equalizer (408) in the receiver (216) performs equalization operations and all other signal equalizers (218) perform no equalization operations (402). In the example method of FIG. 4, a continuous-time linear equalizer (408) in the receiver (216) may be configured to perform equalization operations by consuming less power than any of the other signal equalizers (218). As such, the power aware equalization module (202) may attempt to utilize the continuous-time linear equalizer (408) in the receiver (216) to perform equalization operations prior to utilizing other signal equalizers (218) that consume larger amounts of power. In such a way, when a signal transmitted from the transmitter (214) to the receiver (216) can conform to the required signal eye width and the required signal eye height for signals received by the receiver (216) through the exclusive use of the continuous-time linear equalizer (408) in the receiver (216), total power consumption in the system may be reduced as opposed to performing equalization operations by using other signal equalizers (218) that consume larger amounts of power.

In the example method of FIG. 4, determining (210) power consumption values associated with each of the one or more cumulative equalizer settings can include searching (406) a power lookup table. In the example method of FIG. 4, each of the signal equalizers (218, 408) may be tested during manufacturing to determine the amount of power utilized by each of the signal equalizers (218, 408) at each possible configuration setting. In such a way, the amount of power utilized by each of the signal equalizers (218, 408) at each possible configuration setting may be known and summed for each of the one or more cumulative equalizer settings. Such information may be stored in a power lookup table or other data structure, such that the power aware equalization module (202) may determine total power usage for each of the cumulative equalizer settings that have been identified (208) as resulting in the transmission of a signal that conforms with the required signal eye width and the required signal eye height for signals received by the receiver (216). In the example method of FIG. 4, the power lookup table may reside within memory of the power aware equalization module (202) or within memory of another computing device that is accessible by power aware equalization module (202).

As will be appreciated by one skilled in the art, aspects of embodiments described herein may be embodied as a system, method or computer program product. Accordingly, aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects described in this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure are described above with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of power aware equalization in a serial communications link that includes a transmitter and a receiver, the method comprising:
    determining, by a power aware equalization module, a required signal eye width and a required signal eye height for signals received by the receiver;
    identifying, by the power aware equalization module, one or more signal equalizers for signals transmitted over the serial communications link by the transmitter;
    identifying, by the power aware equalization module, one or more cumulative equalizer settings that equalize signals transmitted over the serial communications link by the transmitter to conform with the required signal eye width and the required signal eye height for signals received by the receiver;
    determining, by the power aware equalization module, power consumption values associated with each of the one or more cumulative equalizer settings; and
    setting, by the power aware equalization module, the one or more signal equalizers to configuration settings in dependence upon the power consumption values associated with each of the one or more cumulative equalizer settings.

2. The method of claim 1 wherein setting the one or more signal equalizers to configuration settings in dependence upon the power consumption values associated with each of the one or more cumulative equalizer settings further comprises setting the one or more signal equalizers to configuration settings associated with the cumulative equalizer setting that consumes the least amount of power.

3. The method of claim 1 wherein identifying, by the power aware equalization module, the one or more cumulative equalizer settings that equalize signals transmitted over the serial communications link by the transmitter to conform with the required signal eye width and the required signal eye height for signals received by the receiver further comprises measuring, with an eye monitor, a resultant eye width and a resultant eye height for signals received by the receiver for the one or more cumulative equalizer settings.

4. The method of claim 1 further comprising adjusting, by the power aware equalization module, the required signal eye width and the required signal eye height for signals received by the receiver.

5. The method of claim 1 wherein the one or more cumulative equalizer settings include only settings such that a continuous-time linear equalizer in the receiver performs equalization operations and all other signal equalizers perform no equalization operations.

6. The method of claim 1 wherein determining the power consumption values associated with each of the one or more cumulative equalizer settings further comprises searching a power lookup table.

7. An apparatus for power aware equalization in a serial communications link that includes a transmitter and a receiver, the apparatus comprising a computer processor, a computer memory operatively coupled to the computer processor, the computer memory storing computer program instructions including a power aware equalization module and that, when executed by the computer processor, cause the apparatus to carry out the steps of:
    determining, by the power aware equalization module, a required signal eye width and a required signal eye height for signals received by the receiver;
    identifying, by the power aware equalization module, one or more signal equalizers for signals transmitted over the serial communications link by the transmitter;

identifying, by the power aware equalization module, one or more cumulative equalizer settings that equalize signals transmitted over the serial communications link by the transmitter to conform with the required signal eye width and the required signal eye height for signals received by the receiver;

determining, by the power aware equalization module, power consumption values associated with each of the one or more cumulative equalizer settings; and setting, by the power aware equalization module, the one or more signal equalizers to configuration settings in dependence upon the power consumption values associated with each of the one or more cumulative equalizer settings.

8. The apparatus of claim 7 wherein setting the one or more signal equalizers to configuration settings in dependence upon the power consumption values associated with each of the one or more cumulative equalizer settings further comprises setting the one or more signal equalizers to configuration settings associated with the cumulative equalizer setting that consumes the least amount of power.

9. The apparatus of claim 7 wherein identifying, by the power aware equalization module, the one or more cumulative equalizer settings that equalize signals transmitted over the serial communications link by the transmitter to conform with the required signal eye width and the required signal eye height for signals received by the receiver further comprises measuring, with an eye monitor, a resultant eye width and a resultant eye height for signals received by the receiver for the one or more cumulative equalizer settings.

10. The apparatus of claim 7 further comprising computer program instructions that, when executed by the computer processor, cause the apparatus to carry out the step of adjusting, by the power aware equalization module, the required signal eye width and the required signal eye height for signals received by the receiver.

11. The apparatus of claim 7 wherein the one or more cumulative equalizer settings include only settings such that a continuous-time linear equalizer in the receiver performs equalization operations and all other signal equalizers perform no equalization operations.

12. The apparatus of claim 7 wherein determining the power consumption values associated with each of the one or more cumulative equalizer settings further comprises searching a power lookup table.

13. A computer program product for power aware equalization in a serial communications link that includes a transmitter and a receiver, the computer program product comprising a non-transitory computer readable medium, the computer program product storing computer program instructions that, when executed by a computer processor, cause a computer to carry out the steps of:

determining, by a power aware equalization module, a required signal eye width and a required signal eye height for signals received by the receiver;

identifying, by the power aware equalization module, one or more signal equalizers for signals transmitted over the serial communications link by the transmitter;

identifying, by the power aware equalization module, one or more cumulative equalizer settings that equalize signals transmitted over the serial communications link by the transmitter to conform with the required signal eye width and the required signal eye height for signals received by the receiver;

determining, by the power aware equalization module, power consumption values associated with each of the one or more cumulative equalizer settings; and setting, by the power aware equalization module, the one or more signal equalizers to configuration settings in dependence upon the power consumption values associated with each of the one or more cumulative equalizer settings.

14. The computer program product of claim 13 wherein setting the one or more signal equalizers to configuration settings in dependence upon the power consumption values associated with each of the one or more cumulative equalizer settings further comprises setting the one or more signal equalizers to configuration settings associated with the cumulative equalizer setting that consumes the least amount of power.

15. The computer program product of claim 13 wherein identifying, by the power aware equalization module, the one or more cumulative equalizer settings that equalize signals transmitted over the serial communications link by the transmitter to conform with the required signal eye width and the required signal eye height for signals received by the receiver further comprises measuring, with an eye monitor, a resultant eye width and a resultant eye height for signals received by the receiver for the one or more cumulative equalizer settings.

16. The computer program product of claim 13 wherein the computer program instructions that, when executed by the computer processor, cause the computer to further carry out the step of adjusting, by the power aware equalization module, the required signal eye width and the required signal eye height for signals received by the receiver.

17. The computer program product of claim 13 wherein the one or more cumulative equalizer settings include only settings such that a continuous-time linear equalizer in the receiver performs equalization operations and all other signal equalizers perform no equalization operations.

18. The computer program product of claim 13 wherein determining the power consumption values associated with each of the one or more cumulative equalizer settings further comprises searching a power lookup table.

\* \* \* \* \*